United States Patent
Bian et al.

(10) Patent No.: US 7,736,767 B2
(45) Date of Patent: Jun. 15, 2010

(54) PERPENDICULAR MAGNETIC RECORDING MEDIUM HAVING AN INTERLAYER FORMED FROM A NIWCR ALLOY

(75) Inventors: Xiaoping Bian, Saratoga, CA (US); Qing Dai, San Jose, CA (US); Mary F. Minardi, Santa Cruz, CA (US); Mohammad T. Mirzamaani, San Jose, CA (US); Kentaro Takano, San Jose, CA (US); Kai Tang, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 277 days.

(21) Appl. No.: 11/681,693

(22) Filed: Mar. 2, 2007

(65) Prior Publication Data

US 2008/0213629 A1    Sep. 4, 2008

(51) Int. Cl.
  *G11B 5/66* (2006.01)
(52) U.S. Cl. .................................................... 428/831
(58) Field of Classification Search ........................ None
  See application file for complete search history.

(56) References Cited

U.S. PATENT DOCUMENTS

| | | | |
|---|---|---|---|
| 4,006,015 | A | 2/1977 | Watanabe et al. |
| 5,789,090 | A | 8/1998 | Okumura et al. |
| 6,677,061 | B2 | 1/2004 | Shimizu et al. |
| 2002/0018917 | A1 | 2/2002 | Sakai et al. |
| 2004/0106010 | A1 | 6/2004 | Iwasaki et al. |
| 2005/0249870 | A1 | 11/2005 | Kawada |
| 2006/0083951 | A1 | 4/2006 | Arai et al. |
| 2006/0088734 | A1 | 4/2006 | Arai et al. |
| 2006/0127703 | A1 | 6/2006 | Takekuma et al. |
| 2007/0153419 | A1 * | 7/2007 | Arai et al. .................. 360/131 |

FOREIGN PATENT DOCUMENTS

| | | |
|---|---|---|
| JP | 59157828 | 9/1984 |
| JP | 60236115 | 11/1985 |
| JP | 1287820 | 11/1989 |
| JP | 5109044 | 4/1993 |
| JP | 2006099951 | 4/2006 |
| JP | 2006185566 | 7/2006 |
| WO | WO2006022437 | 3/2006 |

OTHER PUBLICATIONS

Machine translation of JP2001-006145, Suzuki et al., Jan. 2001.*
McIntire, Gregory L., Brucker, Charles F., "Cobalt Chromium Perpendicular Magnetic Recording Media: A Corrosion Study", IEEE Transactions on Magnetics, vol. 24, No. 5, pp. 2221-2225 (Sep. 1988).
Osaka, T et al., "The Effects of an Underlayer on Recording Characteristics of Electroless Plated Perpendicular Recording Flexible Media", IEEE Transactions on Magnetics, vol. 23, No. 5, pp. 2356-2358 (Sep. 1987).

* cited by examiner

*Primary Examiner*—Holly Rickman
(74) *Attorney, Agent, or Firm*—Duft Bornsen & Fishman, LLP

(57) ABSTRACT

Perpendicular magnetic recording media and methods of fabricating perpendicular magnetic recording media are described. The perpendicular magnetic recording medium of one embodiment includes an interlayer, an underlayer, and a perpendicular magnetic recording layer. The interlayer is formed from a NiWCr alloy.

9 Claims, 4 Drawing Sheets

PERPENDICULAR MAGNETIC RECORDING MEDIUM HAVING AN INTERLAYER FORMED FROM A NIWCR ALLOY

BACKGROUND OF THE INVENTION

1. Field of the Invention

The invention is related to the field of magnetic disk drive systems and, in particular, to a perpendicular magnetic recording medium having an interlayer formed from a NiWCr alloy.

2. Statement of the Problem

One type of recording medium presently used in magnetic recording/reproducing apparatuses is a longitudinal magnetic recording medium. A longitudinal magnetic recording medium includes a magnetic recording layer having an easy axis of magnetization parallel to the substrate. The easy axis of magnetization is the crystalline axis that is aligned along the lowest energy direction for the magnetic moment. Another type of recording medium is a perpendicular magnetic recording medium. A perpendicular magnetic recording medium includes a magnetic recording layer having an easy axis of magnetization oriented substantially perpendicular to the substrate. Hexagonal Close Packed (HCP) Co-alloys are typically used as the magnetic recording layer for both longitudinal and perpendicular recording. The easy axis of magnetization for these materials lies along the c-axis or <0001> direction.

The perpendicular magnetic recording medium is generally formed with a substrate, a soft magnetic underlayer (SUL), an interlayer, an underlayer, a perpendicular magnetic recording layer, and a protective layer for protecting the surface of the perpendicular magnetic recording layer. The soft magnetic underlayer (SUL) serves to concentrate a magnetic flux emitted from a main pole of a write head and to serve as a flux return path back to a return pole of the write head during recording on the magnetic recording layer. The underlayer and the interlayer serve to control the size of magnetic crystal grains and the orientation of the magnetic crystal grains in the magnetic recording layer. The underlayer and the interlayer also serve to magnetically de-couple the SUL and the perpendicular magnetic recording layer.

The interlayer may be an amorphous material or a crystalline material with a Face Centered Cubic (FCC) or HCP structure. For example, Ni or Cu alloys such as NiFe or CuNb may be used for the interlayer. One problem with many present layer structures for perpendicular magnetic recording media is that if the interlayer is made of a material that is ferromagnetic, then the material can couple with the soft magnetic underlayer and increase the media noise. It is also desirable for the interlayer to give rise to small, uniform grains and strong perpendicular c-axis orientation in the underlayer and magnetic layer. This creates maximum signal-to-noise ratio (SNR) and high coercivity (Hc) for the medium.

Other types of material that may be used for the interlayer is NiV, NiCr, and NiW. The use of these alloys gives rise to superior c-axis perpendicular crystallographic texture of the subsequently-deposited underlayer and perpendicular magnetic recording layer. One drawback to using NiV or NiW alloys for the interlayer is that the interlayer may be susceptible to corrosion, especially if the thickness of the interlayer is above about 8 nanometers.

SUMMARY OF THE SOLUTION

The invention solves the above and other related problems with an interlayer formed from a NiWCr alloy. The NiWCr alloy controls the size and orientation of the magnetic crystal grains in the magnetic recording layer and therefore provides superior magnetic recording performance much like presently used interlayers. At the same time, the NiWCr alloy is less susceptible to corrosion than some other alloys, such as NiV and NiW. A NiWCr interlayer may be formed thicker than some prior interlayers without the risk of increased corrosion, which gives manufacturers more flexibility in designing perpendicular magnetic recording media. Although NiCr alloys also have excellent corrosion resistant properties, an NiWCr alloy exhibits significantly improved magnetic recording properties compared to NiCr.

One embodiment of the invention comprises a perpendicular magnetic recording medium that includes the improved interlayer. The perpendicular magnetic recording medium includes, among other layers, the interlayer, an underlayer, and a perpendicular magnetic recording layer. The interlayer is formed from a NiWCr alloy. Because the NiWCr alloy exhibits improved corrosion resistance as compared to other alloys, such as NiW, the NiWCr alloy as an interlayer provides a perpendicular magnetic recording medium with an improved corrosion resistance characteristic.

The invention may include other exemplary embodiments described below.

DESCRIPTION OF THE DRAWINGS

The same reference number represents the same element or same type of element on all drawings.

DETAILED DESCRIPTION OF THE INVENTION

FIGS. 1-8 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
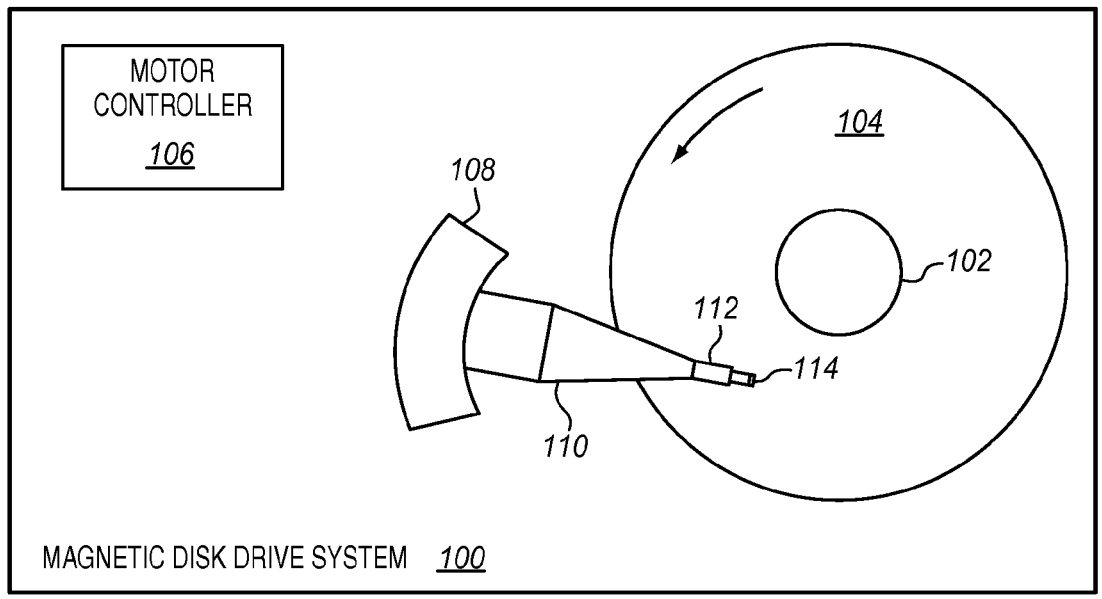
FIG. 1 illustrates a magnetic disk drive system in an exemplary embodiment.

FIG. 1 illustrates a magnetic disk drive system 100 in an exemplary embodiment of the invention. Magnetic disk drive system 100 includes a spindle 102, a perpendicular magnetic recording medium 104, a motor controller 106, an actuator 108, an actuator arm 110, a suspension arm 112, and a recording head 114. Spindle 102 supports and rotates a perpendicular magnetic recording medium 104 in the direction indicated by the arrow. A spindle motor (not shown) rotates spindle 102 according to control signals from motor controller 106. Recording head 114 is supported by suspension arm 112 and actuator arm 110. Actuator arm 110 is connected to actuator 108 that is configured to rotate in order to position recording head 114 over a desired track of perpendicular magnetic recording medium 104. Magnetic disk drive system 100 may include other devices, components, or systems not shown in FIG. 1. For instance, a plurality of magnetic disks, actuators, actuator arms, suspension arms, and recording heads may be used.

When perpendicular magnetic recording medium 104 rotates, an air flow generated by the rotation of magnetic disk 104 causes an air bearing surface (ABS) of recording head 114 to ride on a cushion of air at a particular height above magnetic disk 104. The height depends on the shape of the ABS. As recording head 114 rides on the cushion of air, actuator 108 moves actuator arm 110 to position a read element (not shown) and a write element (not shown) in recording head 114 over selected tracks of perpendicular magnetic recording medium 104.

The perpendicular magnetic recording medium 104 is shown as a disk in FIG. 1. However, a perpendicular magnetic recording medium as discussed can take on other forms in other embodiments.

Figure 2:
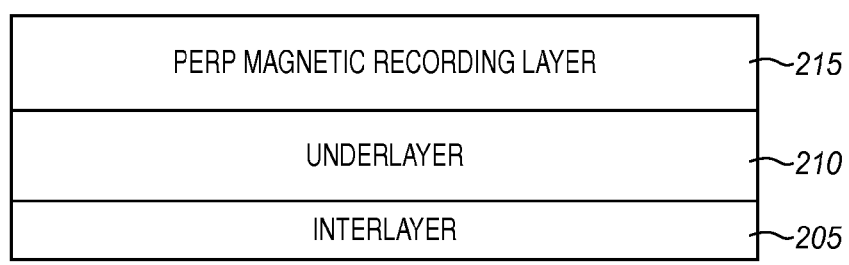
FIGS. 2-4 illustrate perpendicular magnetic recording media in exemplary embodiments.
Figure 3:
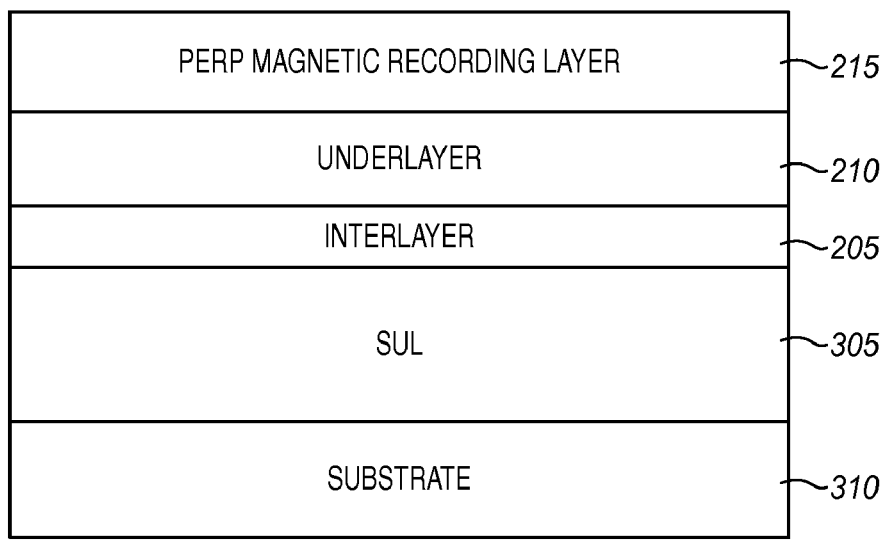
Figure 4:
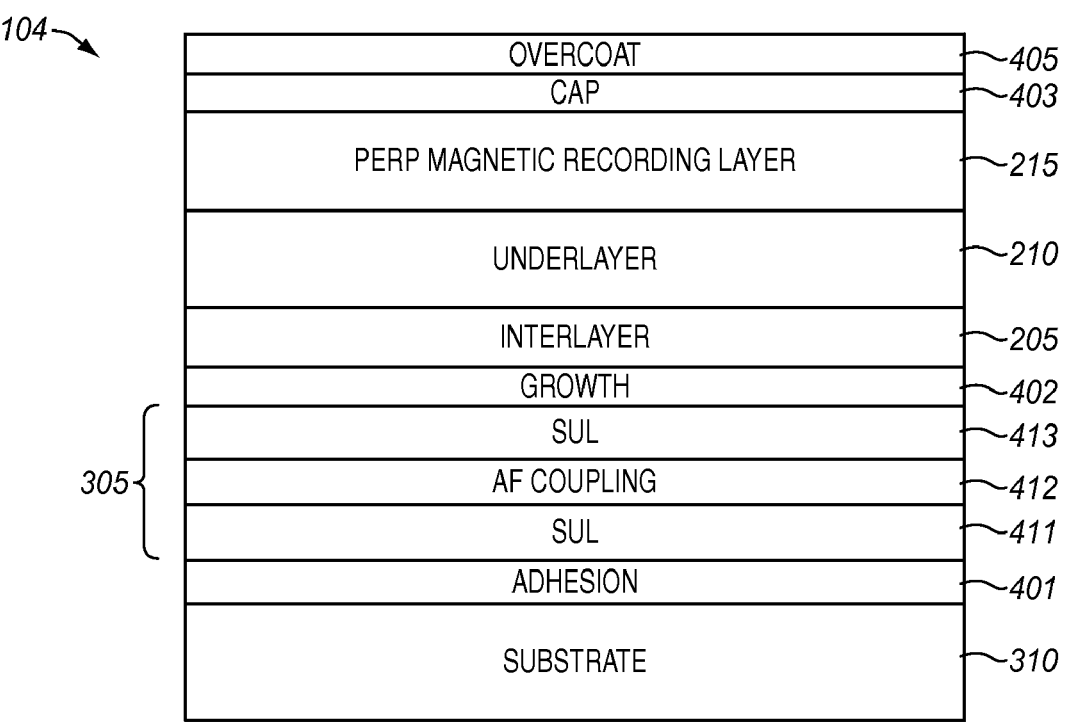

FIGS. 2-4 illustrate possible embodiments of the perpendicular magnetic recording medium 104.

FIG. 2 is a cross-sectional view of one possible embodiment of perpendicular magnetic recording medium 104. Perpendicular magnetic recording medium 104 includes an interlayer 205, an underlayer 210, and a perpendicular magnetic recording layer 215. The layers shown in FIG. 2 may be deposited on a substrate (not shown) or on multiple other layers (not shown) previously deposited on a substrate. Perpendicular magnetic recording medium 104 may include other layers not shown in FIG. 2.

Perpendicular magnetic recording layer 215 comprises one or more materials that have an easy axis of magnetization oriented substantially perpendicular to the substrate. Perpendicular magnetic recording layer 215 is typically formed from a Co-alloy and may contain elements such as Cr and Pt as well as oxides such as $SiO_2$.

Interlayer 205 and underlayer 210 control the orientation and grain diameter of the perpendicular magnetic recording layer 215. Underlayer 210 may be formed from a material having an HCP structure, such as Ru. According to this embodiment, interlayer 205 is comprised of a NiWCr alloy. The NiWCr alloy may have a thickness ranging between about 2-20 nanometers.

The NiWCr alloy of interlayer 205 is nonmagnetic which reduces or eliminates magnetic coupling with a soft magnetic underlayer that is not shown in FIG. 1. The NiWCr alloy also exhibits a higher resistance to corrosion than other materials used for the prior interlayers, such as NiV and NiW. The susceptibility to corrosion may be measured using techniques such as anodic current measurements (see also FIG. 5). Higher anodic current indicates increased susceptibility to corrosion.

Figure 5:
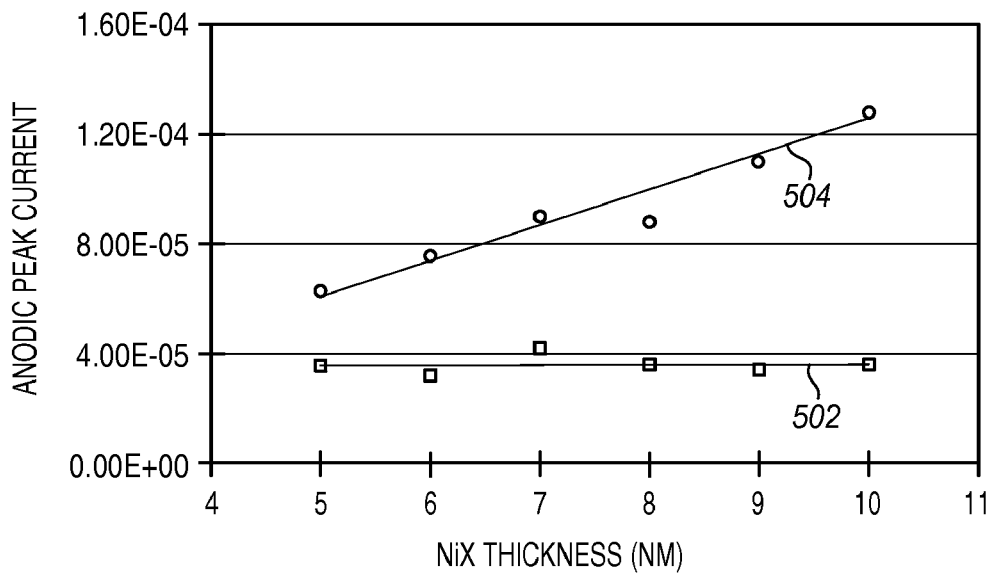
FIG. 5 is a graph illustrating the corrosion resistance properties of a NiWCr alloy in an exemplary embodiment.

FIG. 5 is a graph illustrating the corrosion resistance properties of a NiWCr alloy in an exemplary embodiment. Line 502 illustrates anodic peak current at a range of material thicknesses for NiWCr (at 6 atomic percent W and 8 atomic percent Cr). As the thickness of the NiWCr layer increases from about 5 nanometers to 10 nanometers, the anodic peak current does not change. This indicates that the magnetic recording medium does not become more susceptible to corrosion as the layer gets thicker. As a comparison, line 504 illustrates anodic peak current at a range of material thicknesses for NiW (at 6 atomic percent W). For NiW, the anodic current is higher and is seen to increase with film thickness. In order to maintain acceptable corrosion performance for a magnetic recording medium containing NiW, film thickness of the interlayer should be below about 7-8 nanometers. This indicates that the corrosion resistance properties of the NiWCr are significantly improved compared to NiW. Film thickness limits for NiWCr are not required to obtain excellent corrosion properties.

For the NiWCr alloy, the concentrations of the elements may vary to provide desired properties for the interlayer 205. For instance, the concentration of W in the NiWCr alloy may be between about 2-12 atomic percent. The concentration of Cr in the NiWCr alloy may be between about 3-20 atomic percent.

FIG. 3 is a cross-sectional view of another possible embodiment of perpendicular magnetic recording medium 104. As in FIG. 2, perpendicular magnetic recording medium 104 includes interlayer 205, underlayer 210, and perpendicular magnetic recording layer 215. In FIG. 3, perpendicular magnetic recording medium 104 further includes a soft magnetic underlayer (SUL) 305 and a substrate 310. Substrate 310 is the base upon which the other materials are deposited. Substrate 310 may be comprised of a nonmagnetic metal, such as aluminum or an aluminum alloy, or may be comprised of a nonmagnetic material, such as glass, ceramics, silicon, etc.

SUL 305 acts in conjunction with the write head to increase the perpendicular field magnitude and improve the field gradient generated by a recording head passing over the perpendicular magnetic recording medium 104. Perpendicular magnetic recording medium 104 may include other layers not shown in FIG. 3.

FIG. 4 is a cross-sectional view of another possible embodiment of perpendicular magnetic recording medium 104. As in FIG. 3, perpendicular magnetic recording medium 104 includes substrate 310, SUL 305, interlayer 205, underlayer 210, and perpendicular magnetic recording layer 215. In addition to these layers, perpendicular magnetic recording medium 104 further includes an adhesion layer 401, an amorphous growth layer 402, a cap layer 403, and an overcoat layer 405 in this embodiment.

Adhesion layer 401 is formed on the substrate from a material such as AlTi. SUL 305 is comprised of three layers that are formed on adhesion layer 401. SUL 305 is comprised of a first SUL layer 411 formed on adhesion layer 401 from a material such as CoFeTaZr, an antiferromagnetic (AF) coupling layer 412 formed on the first SUL layer 411 from a material such as Ru, and a second SUL layer 413 formed on the AF coupling layer 412 from a material such as CoFeTaZr. Amorphous growth layer 402 is formed on the second SUL layer 413 from a material such as CrTi. Interlayer 205 is formed on the growth layer 402 from a NiWCr alloy. Underlayer 210 is formed on interlayer 205 from a material such as Ru. Perpendicular magnetic recording layer 215 is formed on underlayer 210 from a material such as CoPtCr—SiOx. Cap layer 403 is formed on perpendicular magnetic recording layer 215 from a material such as CoPtCrB. Overcoat layer 405 is formed on cap layer 403. Overcoat layer 405 protects perpendicular magnetic recording layer 215 against damage if the recording head happens to contact the perpendicular magnetic recording medium 104.

Figure 6:
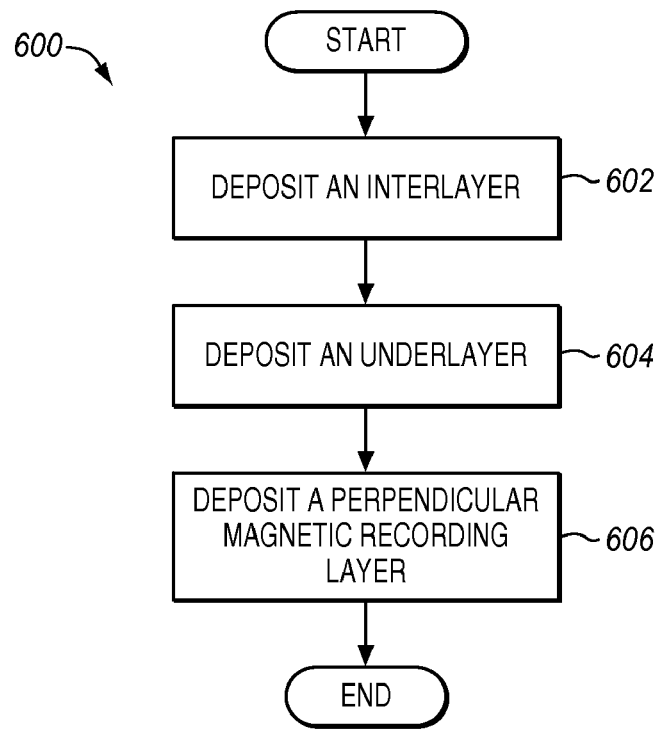
FIGS. 6-8 are flow charts illustrating possible methods of fabricating a perpendicular magnetic recording medium in exemplary embodiments.
Figure 7:
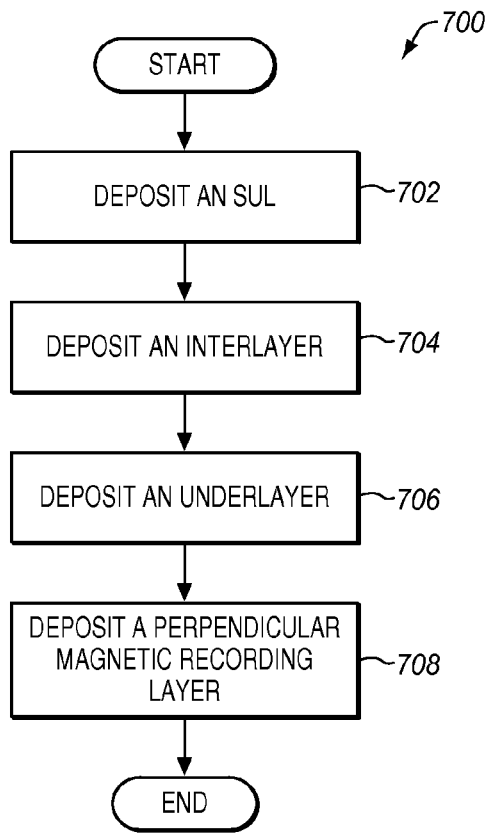
Figure 8:
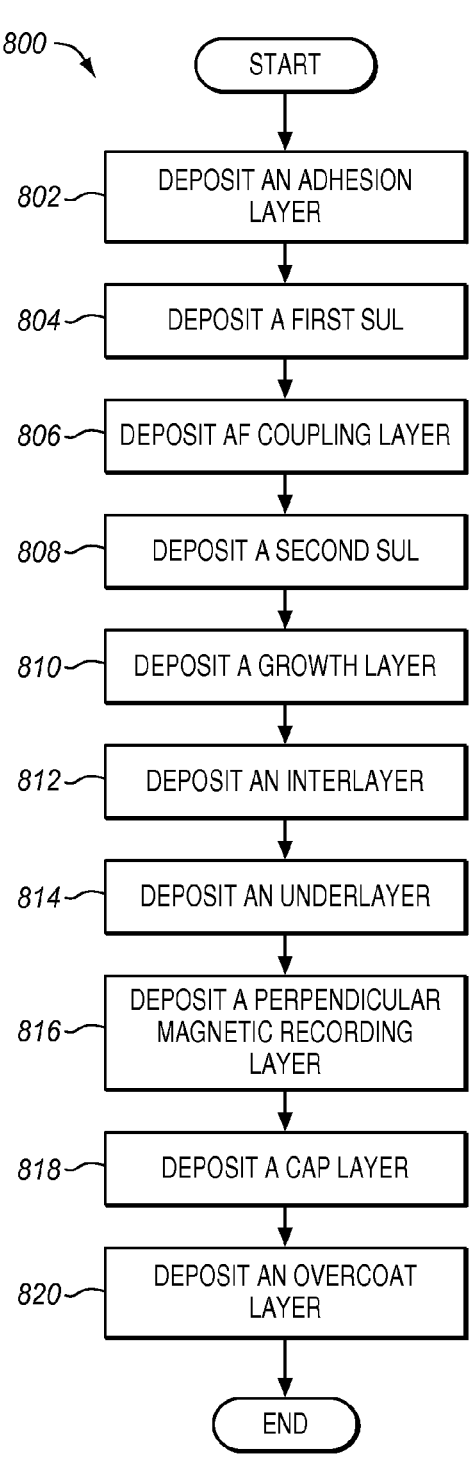

FIGS. 6-8 illustrate possible methods of fabricating the perpendicular magnetic recording medium 104.

FIG. 6 is a flow chart of one possible method 600 of fabricating perpendicular magnetic recording medium 104. In step 602, material for an interlayer 205 is deposited (see FIG. 2). The interlayer 205 may be deposited on a substrate or on other layers previously deposited. As stated above, the interlayer 205 is comprised of a NiWCr alloy. In step 604, material for an underlayer 210 is deposited on the interlayer 205. The material for the underlayer 210 may comprise Ru or another similar material. In step 606, material for a perpendicular magnetic recording layer 215 is deposited on the underlayer 210. The material for the perpendicular magnetic recording layer 215 may comprise CoPtCr—SiOx or another similar material. Method 600 forms the perpendicular magnetic recording medium 104 illustrated in FIG. 2. There may be other layers of material deposited than those described in method 600.

FIG. 7 is a flow chart of another possible method 700 of fabricating perpendicular magnetic recording medium 104. In step 702, material for a soft magnetic underlayer (SUL) 305 is deposited on a substrate 310 (see FIG. 3). In step 704, material for an interlayer 205 is deposited on the SUL 305. In step 706, material for an underlayer 210 is deposited on the interlayer 205. In step 708, material for a perpendicular magnetic recording layer 215 is deposited on the underlayer 210. Method 700 forms the perpendicular magnetic recording medium 104 illustrated in FIG. 3. There may be other layers of material deposited than those described in method 700.

FIG. 8 is a flow chart of another possible method 800 of fabricating perpendicular magnetic recording medium 104. In step 802, material for an adhesion layer 401 is deposited on a substrate 310 (see FIG. 4). In step 804, material for a first SUL layer 411 is deposited on adhesion layer 401. In step 806, material for an AF coupling layer 412 is deposited on the first SUL layer 411. In step 808, material for a second SUL layer 413 is deposited on the AF coupling layer 412. In step 810, material for an amorphous growth layer 402 is deposited on the second SUL layer 413. In step 812, material for an interlayer 205 is deposited on the growth layer 402. In step 814, material for an underlayer 210 is deposited on the interlayer 205. In step 816, material for a perpendicular magnetic recording layer 215 is deposited on the underlayer 210. In step 818, material for a cap layer 403 is deposited on the perpendicular magnetic recording layer 215. In step 820, overcoat layer 405 is deposited on the cap layer 403. Method 800 forms the perpendicular magnetic recording medium 104 illustrated in FIG. 4. There may be other layers of material deposited than those described in method 800.

Although specific embodiments were described herein, the scope of the invention is not limited to those specific embodiments. The scope of the invention is defined by the following claims and any equivalents thereof

We claim:

1. A perpendicular magnetic recording medium, comprising:
    a soft magnetic underlayer (SUL) deposited on a nonmagnetic substrate;
    an interlayer deposited directly on the SUL;
    an underlayer deposited directly on the interlayer; and
    a perpendicular magnetic recording layer deposited directly on the underlayer and having an easy axis of magnetization oriented substantially perpendicular to the substrate;
    wherein the interlayer is formed from a NiWCr alloy having a concentration of W in the range of about 2 to 12 atomic percent and having a concentration of Cr in the range of about 3 to 20 atomic percent.

2. The perpendicular magnetic recording medium of claim 1 wherein the thickness of the interlayer is in the range of about 2 nanometers to 20 nanometers.

3. The perpendicular magnetic recording medium of claim 1 wherein the underlayer comprises Ru.

4. The perpendicular magnetic recording medium of claim 1 further comprising:
    an overcoat layer deposited on the perpendicular magnetic recording layer to protect the perpendicular magnetic recording layer.

5. A method of fabricating a perpendicular magnetic recording medium, the method comprising:
    depositing material for a soft magnetic underlayer (SUL);
    depositing an interlayer directly on the SUL;
    depositing an underlayer directly on the interlayer; and
    depositing a perpendicular magnetic recording layer directly on the underlayer;
    wherein the interlayer is formed from a NiWCr alloy having a concentration of W in the range of about 2 to 12 atomic percent and having a concentration of Cr in the range of about 3 to 20 atomic percent.

6. The method of claim 5 wherein the thickness of the interlayer is in the range of about 2 nanometers to 20 nanometers.

7. The method of claim 5 further comprising:
    depositing material for an overcoat layer on the perpendicular magnetic recording layer.

8. A magnetic disk drive system, comprising:
    a recording head; and
    a perpendicular magnetic recording medium readable and writable by the recording head, the perpendicular magnetic recording medium comprising:
        a soft magnetic underlayer (SUL);
        an interlayer deposited directly on the SUL;
        an underlayer deposited directly on the interlayer; and
        a perpendicular magnetic recording layer deposited directly on the underlayer;
        wherein the interlayer is formed from a NiWCr alloy having a concentration of W in the range of about 2 to 12 atomic percent and having a concentration of Cr in the range of about 3 to 20 atomic percent.

9. The magnetic disk drive system of claim 8 wherein the thickness of the interlayer is in the range of about 2 nanometers to 20 nanometers.

* * * * *